United States Patent [19]

Fox

[11] 4,415,237

[45] Nov. 15, 1983

[54] RADIATION DOSIMETER

[75] Inventor: Richard J. Fox, Oak Ridge, Tenn.

[73] Assignee: The United States of America as represented by the U.S. Department of Energy, Washington, D.C.

[21] Appl. No.: 298,448

[22] Filed: Sep. 1, 1981

[51] Int. Cl.³ ............................................. G01T 1/22
[52] U.S. Cl. .................................. 250/370; 250/336.1
[58] Field of Search ................ 250/336, 370, 371, 374

[56] References Cited

U.S. PATENT DOCUMENTS

| | | | |
|---|---|---|---|
| 4,243,885 | 1/1981 | Agouridis et al. | 250/370 |
| 4,255,659 | 3/1981 | Kaufman et al. | 250/370 |
| 4,301,367 | 11/1981 | Hsu | 250/370 |

OTHER PUBLICATIONS

Walford et al., "The Development and Application of Coaxial CdTe Medical Probes for Use in the Clinical Environment", *IEEE Trans. on Nuc. Sci.*, vol. NS-20, pp. 318-328, 1973.

Wolf et al., "Use of a CdTe Detector in a Tiny Personal Radiation Chirper", *IEEE Trans. on Nuc. Sci.*, vol. NS-26, No. 1, Feb. 1979.

*Primary Examiner*—Janice A. Howell
*Attorney, Agent, or Firm*—David E. Breeden; Stephen D. Hamel; Richard G. Besha

[57] ABSTRACT

A radiation detector readout circuit is provided which produces a radiation dose-rate readout from a detector even though the detector output may be highly energy dependent. A linear charge amplifier including an output charge pump circuit amplifies the charge signal pulses from the detector and pumps the charge into a charge storage capacitor. The discharge rate of the capacitor through a resistor is controlled to provide a time-dependent voltage which when integrated provides an output proportional to the dose-rate of radiation detected by the detector. This output may be converted to digital form for readout on a digital display.

5 Claims, 5 Drawing Figures

RADIATION DOSIMETER

BACKGROUND OF THE INVENTION

This invention relates generally to ionizing radiation monitors and, more particularly, to improvements in solid-state radiation dose-rate meters which employ energy dependent radiation detectors. It is a result of a contact with the United States Department of Energy.

In the art of radiation dosimetry, attempts have been made to employ solid-state detectors to replace gas-filled chamber type detectors (ionization chambers, Geiger-Mueller (G-M) tubes, etc.) as personal radiation dosimeters. Solid-state detectors of such semiconductors as silicon, germanium, and recently cadmium telluride (CdTe) are being investigated as solid-state replacements of the well known G-M tube, for example. In addition to the usual advantages of solid-state devices, i.e., lower cost, miniaturization, reliability, etc., a solid-state radiation detector provides improved stopping power especially for gamma rays due to their high density and therefore, the detector crystals may be greatly reduced in size as compared to a gas-filled counter. Further, the high voltage power requirements for gas-filled counters along with the added circuit complexity requires additional battery space which is not required with a solid-state detector.

However, a problem with solid-state detectors, especially CdTe, exists in that they are severely limited by the dependence of the response on the energy of the detected radiation. When a typical non-spectrometer grade CdTe detector is subjected to a constant single energy gamma flux, there will be a distribution of output pulse amplitudes as if the detector is being exposed to a broad range of differing energy photons. The charge collected as a result of a gamma-ray interaction depends on where the event took place in the CdTe crystal. This is due primarily to charge trapping effects within the detector sensitive volume. However, it has been found that a weighted time average of the collected charge output is a reliable measure of the gamma-ray dose rate.

Therefore, to take advantage of the desirable properties of CdTe and other high Z semiconductors to provide a reliable solid-state dose-rate meter, there is a need for a circuit which provides a weighted time average of the output charge pulses of an energy dependent radiation detector.

SUMMARY OF THE INVENTION

In view of the above need, it is an object of this invention to provide an ionizing radiation dose-rate meter which compensates for an energy dependent radiation detector.

Further, it is an object of this invention to provde a dose-rate meter which takes advantage of the desirable properties of solid-state detection media.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, the radiation dose-rate meter of this invention may comprise a charge amplifier means for detecting and amplifying signals from an ionizing radiation detector. The detector signals being indicative of the charge collected due to the occurance of ionizing events within the sensitive region of the detector. A charge storage capacitor is connected to accumulate the amplifier charge signal which is pumped into the capacitor by the charge amplifier. The capacitor is discharged through a selected resistance to control the discharge rate. An integrator means is provided to integrate the capacitor discharge current signals to produce a weighted time average of the detector charge signals in the form of a voltage which is proportional to the ionization induced in the detector.

The charge amplifier may be made to produce a response proportional to the input dose rate by providing a variable threshold discriminator which renders the circuit less sensitive to low energy photons (below 60 Kev) and provides sufficient electronic noise suppression.

BRIEF DESCRIPTION OF THE DRAWINGS

The accompanying drawings, which are incorporated in and form a part of the specification, illustrate one embodiment of the invention and, together with the description, serve to explain the principles of the invention. In the drawings.

and

Figure 1:
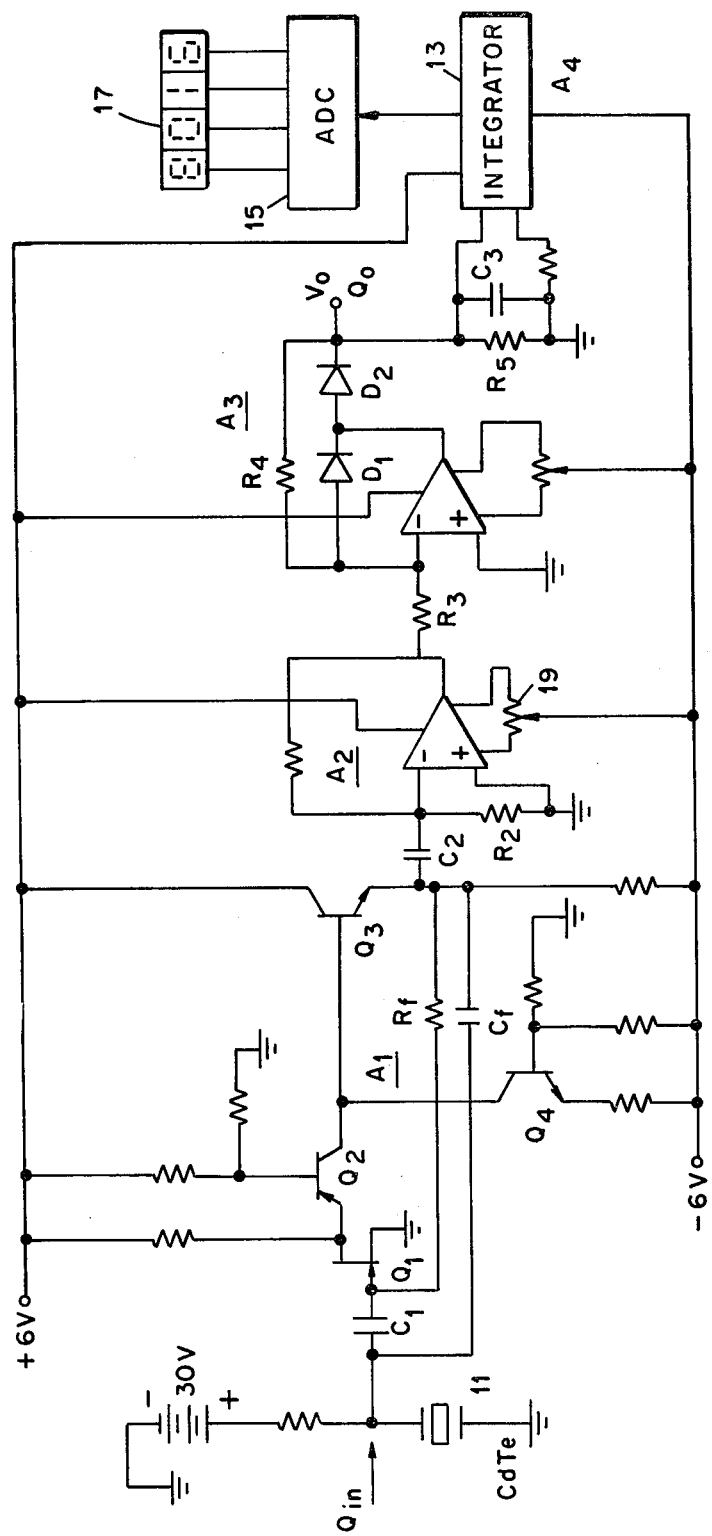
FIG. 1 is a schematic diagram of a radiation dose-rate meter in accordance with the present invention.
Figure 3:
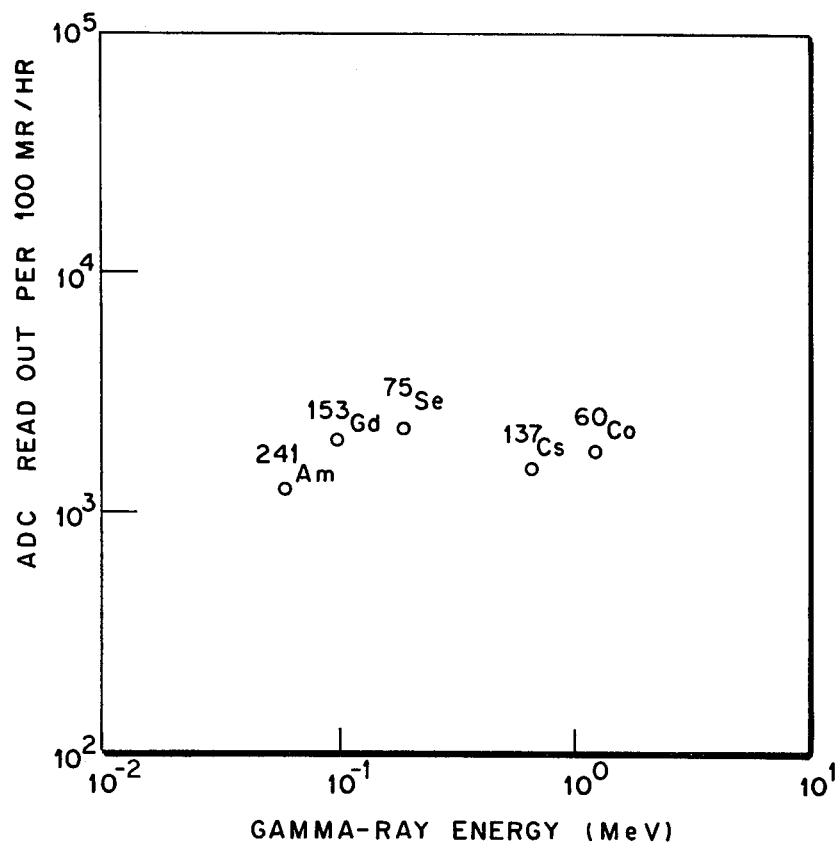

FIG. 3 is a graph of the response of the dose-rate meter of FIG. 1 for constant dose rates from differing energy gamma sources.

DETAILED DESCRIPTION OF THE INVENTION

Figures 2A, 2B, 2C:
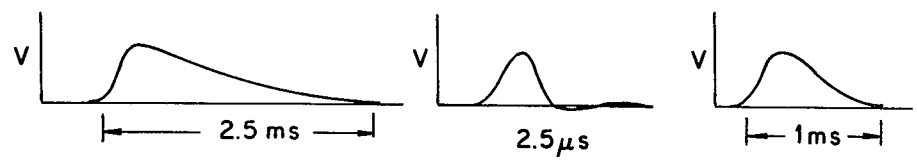
FIG. 2, consisting of FIGS. 2a through 2c, is a graphic illustration of the pulse shapes at various points of the circuit of FIG. 1.

Referring to FIG. 1, the invention will be illustrated by means of a dose-rate meter employing a CdTe detector 11 for detecting gamma rays. The input to the circuit, $Q_{in}$, is the amount of charge originating in the CdTe detector from the interaction of a gamma-ray. The charge, $Q_{in}$, is converted to a voltage pulse proportional to the charge $Q_{in}$ by means of a conventional charge feedback amplifier $A_1$ consisting of transistors $Q_1$, $Q_2$, $Q_3$, and $Q_4$. The feedback time constant $(R_f C_f)$ of amplifier $A_1$ is about 2.5 ms so that the voltage pulse at the output of $A_1$ has a very slow decay time in order to minimize the undershoot of the pulse from the following stage, amplifier $A_2$. The pulse shapes at the output of $A_1$ and $A_2$ are shown in FIGS. 2a and 2b, respectively.

For signal-to-noise improvement, amplifier $A_2$ serves as a differentiator by menas of capacitor $C_2$ and resistor $R_2$ which limits the low frequency response of the circuit. The output pulse of amplifier $A_2$ is essentially unipolar. The differentiating time constant of $A_2$ is about 2.5 μs. The voltage pulse height out of $A_2$ is linear with respect to the charge $Q_{in}$.

Amplifier $A_3$ connected to the output of amplifier $A_2$ in conjuction with the diodes $D_1$ and $D_2$ operates as an "ideal diode" circuit. It functions as a charge pump to accumulate a charge $Q_o$ proportional to the charge $Q_{in}$ onto a capacitor $C_3$ connected between the output of $A_3$ and ground potential. The configuration of amplifier $A_3$ also eliminates any residual undershoot from the signal at the output of the differentiator $A_2$. Thus, the amplifier circuits $A_1$, $A_2$ and $A_3$ operate as a linear charge amplifier.

The charge $Q_o$ on capacitor $C_3$ leaks off through a parallel resistor $R_5$ (time constant about 1 ms) to produce a time-dependent voltage drop. This voltage (FIG. 2c) is supplied to the input of a dual-slope voltage integrator 13. The output of the integrator is connected to an analog-to-digital convertor 15 where the integrated charge signal is converted for display on a digital read-out device 17.

It is not satisfactory to integrate the voltage pulse coming out of $A_2$. Without the charge pump in $A_3$, its integral bears no linear relationship to $Q_{in}$. On the other hand, using that voltage pulse as a charge pump to $C_3$ and integrating the voltage across $R_5$ does give a linear measure of $Q_{in}$.

Assuming that the output voltage pulse of $A_3(V_o)$ is proportional to $Q_{in}$, where $Q_{in}$ is the charge collected due to the charge released in the detector 11 by a gamma-ray photon, then the charge appearing on $C_3$ is $Q_o=C_3V_o$ which is proportional to $Q_{in}$, i.e., linear charge amplification. An integration time interval $\Delta t>>R_5C_3$ results in the following integrator output voltage:

$$R_5 \frac{\Delta Q_o}{\Delta t} = R_5 \int_t^{t+\Delta t} I_5 dt = \int_t^{t+\Delta t} V_o dt,$$

where $I_5$ is the capacitor $C_3$ discharge current. The $R_5C_3$ time constant can be set in the millisecond range so that the system can decay to zero very quickly. Thus, the time average of the charge released in the detector in the time interval $\Delta t$ is measured by the integrator 13. This value is converted to digital form by the ADC 15 for display.

The integrator 13 is preferably a commercially available dual slope integrator which is sold in chip form including the ADC converter. One example is the ICL 7107 sold by Intersil, Cupertino, Calif. The unit can be adapted to provide variable integrating times. It is convenient to set the period for a 0.5 second integration time which is sufficient time to average counts if the counting rate is low (approximately 50 counts/sec.). The integration time does not have to be as long for high count rates, however, the response is not altered when using the 0.5 second period.

Because of the high Z of the CdTe (Z-50) relative to air (Z=7.8), the detector itself does not have an air equivalent response but this is easily compensated by adjusting the $A_2$ stage threshold (DC offset level of $A_2$ output). Thus is accomplished by means of a potentiometer 19 (FIG. 1) in the $A_2$ stage amplifier. This selectivity reduces the system response to the lower energy photons to give an essentially flat response from 60 Kev to 1¼ Mev, as shown in FIG. 3 for the ADC readout for different energy gamma sources as indicated. The bias level is also necessary for electronic noise suppression.

At radiation dose rates above approximately 1 R/hr (>10,000 counts/sec.) dead time corrections are required to linearize the response. The behavior follows approximately that of a nonparalyzable system so the true count rate N is equal to $$\left[\frac{n}{1-\tau_d{}^n}\right]^k$$

where $\tau_d=30$ $\mu$s, k=1.2 and n is the observed count rate. Since n is available in digital form, a microprocessor programmed to solve the above equation for N may be employed to obtain a linear response through the entire range from 0.1 mR/r to 40 R/hr.

Thus, it will be seen that a linear dose-rate meter taking advantage of the desirable properties of a CdTe detector is provided. The meter circuit may also be used with any solid state ionizing radiation detector which produces a charge pulse that is proportional to the energy of the detected radiation. It could even be used with a gas filled ion chamber.

The foregoing description of a preferred embodiment of the invention has been presented for purposes of illustration and descripton. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilized the invention in various embodiments and with various modifications as are suited to the particular use contemplated. It is intended that the scope of the invention be defined by the claims appended hereto.

What is claimed is:

1. A radiation dosimeter, comprising:
   an ionizing radiation detector which produces output signals at an output thereof in response to the charge collected due to the occurance of ionizing events within the sensitive region of said detector;
   a charge amplifier means for detecting and amplifying said signals at said output of said detector which are proportional to said collected charge;
   a charge storage capacitor connected to the output of said amplifier means;
   a resistor connected in parallel with said capacitor for controlling the discharge rate of said capacitor at a selected value;
   and
   an integrator means connected to the output of said charge amplifier means for time averaging the discharge current of said capacitor to generate an output signal at an output thereof proportional to the radiation dose-rate detected by said detector.

2. The dosimeter as set forth in claim 1 wherein said charge amplifier means includes a variable threshold voltage discriminator means for rendering said amplifier means less sensitive to detected photons below about 60 Kev, thereby providing linear dose-rate measurements for detected photons above about 60 Kev.

3. The dosimeter as set forth in claim 2 wherein said charge amplifier means and said integrator means includes a charge feedback amplifier connected to said detector, a differentiator connected to the output of said charge feedback amplifier, a charge pump amplifier connected between the output of said differentiator and said capacitor, and a dual-slope charge integrator connected to the output of said capacitor.

4. The dosimeter as set forth in claim 3 further including an analog-to-digital converter connected to the output of said integrator and a digital readout means connected to the output of said analog-to-digital converter.

5. The dosimeter as set forth in claim 4 wherein said detector is a CdTe detector.

* * * * *